(12) United States Patent
Lanzani et al.

(10) Patent No.: US 11,596,044 B2
(45) Date of Patent: Feb. 28, 2023

(54) CONTROL SYSTEM FOR CONFIGURING A LIGHTING SYSTEM AND A METHOD THEREOF

(71) Applicant: SIGNIFY HOLDING B.V., Eindhoven (NL)

(72) Inventors: Stefano Eugenio Lanzani, Eindhoven (NL); Remco Magielse, Tilburg (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/416,699

(22) PCT Filed: Dec. 17, 2019

(86) PCT No.: PCT/EP2019/085515
§ 371 (c)(1),
(2) Date: Jun. 21, 2021

(87) PCT Pub. No.: WO2020/127174
PCT Pub. Date: Jun. 25, 2020

(65) Prior Publication Data
US 2022/0061139 A1    Feb. 24, 2022

(30) Foreign Application Priority Data

Dec. 21, 2018   (EP) ..................................... 18215178

(51) Int. Cl.
*H05B 47/155*    (2020.01)
*H05B 47/11*     (2020.01)
*H05B 47/19*     (2020.01)

(52) U.S. Cl.
CPC ........... *H05B 47/155* (2020.01); *H05B 47/11* (2020.01); *H05B 47/19* (2020.01)

(58) Field of Classification Search
CPC ...... H05B 47/155; H05B 47/11; H05B 47/19; H05B 45/10; H05B 47/175
See application file for complete search history.

(56) References Cited

U.S. PATENT DOCUMENTS

| | | | |
|---|---|---|---|
| 10,098,201 B1* | 10/2018 | Wilson | F21V 23/02 |
| 2018/0236354 A1* | 8/2018 | Van Boven | H05B 47/155 |
| 2018/0278327 A1* | 9/2018 | Krajnc | H04W 76/10 |
| 2018/0288859 A1 | 10/2018 | Hidaka et al. | |
| 2018/0317305 A1* | 11/2018 | Krajnc | G08B 5/00 |

FOREIGN PATENT DOCUMENTS

WO     2018029010 A1    2/2018

* cited by examiner

*Primary Examiner* — Minh D A (57) ABSTRACT

A method (400) of configuring a lighting system (100) is discloses. The lighting system (100) comprises a first light switch (110) for controlling a first lighting device (130) and a second light switch (120) for controlling a second lighting device (140). The method (400) comprises: receiving (402) a signal indicative of an activation of a first user input element (112) of the first light switch (110), wherein the activation is indicative of a selection of a first light scene, controlling (404) the first lighting device (130) according to the first light scene, and associating (406) a second light scene with a second user input element (122) of the second light switch (120) based on the selected first light scene, such that when the second user input element (122) is activated by a user, the second lighting device (140) is controlled according to the second light scene.

12 Claims, 4 Drawing Sheets

CONTROL SYSTEM FOR CONFIGURING A LIGHTING SYSTEM AND A METHOD THEREOF

CROSS-REFERENCE TO PRIOR APPLICATIONS

This application is the U.S. National Phase application under 35 U.S.C. § 371 of International Application No. PCT/EP2019/085515, filed on Dec. 17, 2019, which claims the benefit of European Patent Application No. 18215178.7, filed on Dec. 21, 2018. These applications are hereby incorporated by reference herein.

FIELD OF THE INVENTION

The invention relates to a method of configuring a lighting system, and to a computer program product for executing the method. The invention further relates to a control system for configuring a lighting system, and to a lighting system comprising the control system.

BACKGROUND

Current smart lighting systems allow a user to control lighting devices via different types of control interfaces. One of these control interfaces is a software application running on a smartphone, pc, tablet, etc. This provides a user a rich user interface with multiple options for lighting control. Another type of control interface uses an accessory device, such as a light switch. Such a light switch provides more limited lighting control options. For example, a light switch may comprise two buttons: an off-button that enables a user to switch one or more lighting devices off, and an on-button that enables the user to switch the one or more lighting devices on. Many of these switches further enable a user to touch/press the on-button multiple times to cycle through a plurality of predefined light scenes to control the one or more lighting devices according to these light scenes. In current systems, a user can configure a light switch via a software application running on a personal device, such as a smartphone. The software enables a user to associate one or more light scenes with buttons on the light switch.

WO 2018029010 A1 discloses a method of controlling a lighting system comprising a first plurality of luminaires located in a first environment and a second plurality of luminaires located in a second environment, the method comprising steps of: receiving a first user input pattern at a light switch of the lighting system operatively coupled to the first plurality of luminaires; determining at least one parameter of a lighting scene being rendered by the first plurality of luminaires when the first user input pattern is received; storing an indication of the first user input pattern in association with the determined at least one parameter; receiving a second user input pattern at the or another light switch of the lighting system, operatively coupled to the second plurality of luminaires; comparing the received second user input pattern with the stored indication of the first user input pattern to determine if the second user input pattern matches the first user input pattern; if the second user input pattern is deter-mined to match the first user input pattern, controlling the second plurality of luminaires to render a matching lighting scene using the at least one parameter.

SUMMARY OF THE INVENTION

The inventors have realized that it may be beneficial to automatically configure light switches, such that user input elements (e.g. buttons, touch sensitive surfaces, rotary elements, etc.) of light switches are associated with light scenes that correspond to the lighting needs of a user. It is therefore an object of the present invention to provide a method and a control system for automatically (re)configuring a light switch to satisfy the (current) lighting needs of a user.

According to a first aspect of the present invention, the object is achieved by a method of configuring a lighting system comprising a first light switch for controlling a first lighting device and a second light switch for controlling a second lighting device, the method comprising:
receiving a signal indicative of an activation of a first user input element of the first light switch, wherein the activation is indicative of a selection of a first light scene,
controlling the first lighting device according to the first light scene, and
associating a second light scene with a second user input element of the second light switch based on the selected first light scene, such that when the second user input element is activated by a user, the second lighting device is controlled according to the second light scene.

A user may select the first light scene via the first light switch. After the selection, the first lighting device (associated with the first light switch) is controlled according to the selected first light scene. Additionally, the second light switch is (re)configured based on the selected first light scene by associating a second light scene with a (second) user input element of the second light switch. The second light scene may be selected/determined/generated based on which first light scene has been selected by a user. In other words, the second light scene is based on the first light scene. This enables a user, for example, to select a first light scene with the first light switch (e.g. a "morning" light scene with a switch located in the user's bedroom), whereupon the second switch (e.g. a light switch located in the user's living room) is automatically reconfigured such that a user input element of that switch is associated with a light scene (e.g. a second "morning" light scene for the living room) that corresponds to the first light scene. This is beneficial, because the second light switch is automatically (re)configured such that the current lighting needs of the user are satisfied.

The method may further comprise:
receiving a signal indicative of a second activation of the first user input element or another user input element of the first light switch, wherein the second activation is indicative of a selection of a secondary first light scene,
controlling the first lighting device according to the secondary first light scene, and
associating a secondary second light scene with the second user input element based on the selected secondary first light scene, such that when the second user input element is activated by a user, the second lighting device is controlled according to the secondary second light scene. This enables a user to provide a second user input to select another light scene with the first light switch. The association between the second user input element of the second light switch may then be updated and the second user input element may be associated with the secondary second light scene, which is based on the selected new (secondary first) light scene.

The method may further comprise:
receiving a signal indicative of an activation of the second user input element of the second light switch, wherein the activation of the second user input element is indicative of a selection of a further light scene for the second lighting device, controlling the second lighting device according to the further light scene, and associating a second further light scene with the first user input element of the first light switch based on the selected further light scene, such that when the first user input element is activated by a user, the first lighting device is controlled according to the second further light scene. This enables a user to provide a user input at the second user input element (after it has been configured based on the selected first light scene) to select a further light scene (the further light scene being a different light scene than the second light scene). Upon selecting the further light scene, the first light switch is configured based on the selected further light scene. This is beneficial, because it enables the user to use the second light switch to configure the first light switch.

Light properties of the second light scene may be substantially similar to light properties of the first light scene. The second light scene may for example be selected or generated such that its color, saturation, intensity, beam angle and/or beam shape is substantially similar to those of the first light scene. This is beneficial, because the relation between the selection of the first light switch and the (re)configuration of the second light switch is clear to the user. Alternatively, light properties of the second light scene may be different from light properties of the first light scene. Additionally or alternatively, light properties of the secondary second light scene may be different from light scene properties of the secondary first light scene.

The color values of the second light scene may be substantially similar to color values of the first light scene, and intensity values of the second light scene may be substantially different from intensity values of the first light scene. The second light scene may be selected or generated such that its color is substantially similar to the color of the first light scene, and that its intensity is substantially different (e.g. higher or lower) than the intensity of the first light scene. This is beneficial, because the relation between the selection of the first light switch and the (re)configuration of the second light switch is clear to the user based on the similar color. This is further advantageous, because for different areas different levels of intensity may be required. For instance, in a bedroom lower intensity levels may be required/desired compared to a living room.

The method may further comprise the step of automatically associating the first user input element and/or the second user input element with a predefined light scene at a predefined moment in time. At predefined moments in time (e.g. at noon, at midnight, etc.) the light scene associated with the first and/or second user input element may be "reset" to a predefined light scene. This is beneficial, because it may not always be desirable that the configuration of a light switch is based on a light scene activated at the another light switch.

The method may further comprise:

receiving a reset signal from the first or the second light switch, and associating the first user input element with a predefined light scene or associating the second user input element with a predefined light scene, respectively. The reset signal may, for example, be generated when a (further) user input element has been activated by a user, or when a specific light scene has been selected by a user.

Such a reset operation may be beneficial, because it may not always be desirable that the configuration of the second light switch is based on the first light scene activated at the first light switch.

The method may further comprise the step of generating the second light scene based on the selected first light scene. The second light scene may, for example, be a copy or an adaptation of the first light scene, wherein the light properties of the first light scene are copied/adapted.

The method may further comprise the step of selecting the second light scene based on the selected first light scene.

The term "light scene" in the context of the present invention should be understood as a one or more lighting control settings for one or more lighting devices. The lighting control settings may relate light properties such as the color, intensity, saturation, beam size, beam shape, etc. according to which the one or more lighting devices are controlled. The light scene may be a dynamic light scene, wherein one or more light properties change over time.

According to a second aspect of the present invention, the object is achieved by a computer program product for a computing device, the computer program product comprising computer program code to perform any of the above-mentioned methods when the computer program product is run on a processing unit of the computing device. According to a third aspect of the present invention, the object is achieved by a control system for configuring a lighting system comprising a first light switch for controlling a first lighting device and a second light switch for controlling a second lighting device, the control system comprising:

an input configured to receive a signal indicative of an activation of a first user input element of the first light switch, wherein the activation is indicative of a selection of a first light scene, wherein the first lighting device is controlled according to the first light scene, and a processor configured to associate a second light scene with a second user input element of the second light switch based on the selected first light scene, such that when the second user input element is activated by a user, the second lighting device is controlled according to the second light scene.

The control system may be comprised in a central control device, and the control system may further comprise a communication unit configured to:

receive the signal from the first light switch, receive lighting control signals from the second light switch, and transmit lighting control signals to the one or more first and second lighting devices.

According to a fourth aspect of the present invention, the object is achieved by a lighting system comprising:

the control system, the first light switch configured to control the first lighting device, and the second light switch configured to control the second lighting device. The lighting system may further comprise the first lighting device and the second lighting device.

It should be understood that the computer program product, the control system and the lighting system may have similar and/or identical embodiments and advantages as the above-mentioned methods.

BRIEF DESCRIPTION OF THE DRAWINGS

The above, as well as additional objects, features and advantages of the disclosed systems, devices and methods will be better understood through the following illustrative and non-limiting detailed description of embodiments of devices and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION OF EMBODIMENTS

Figure 1:
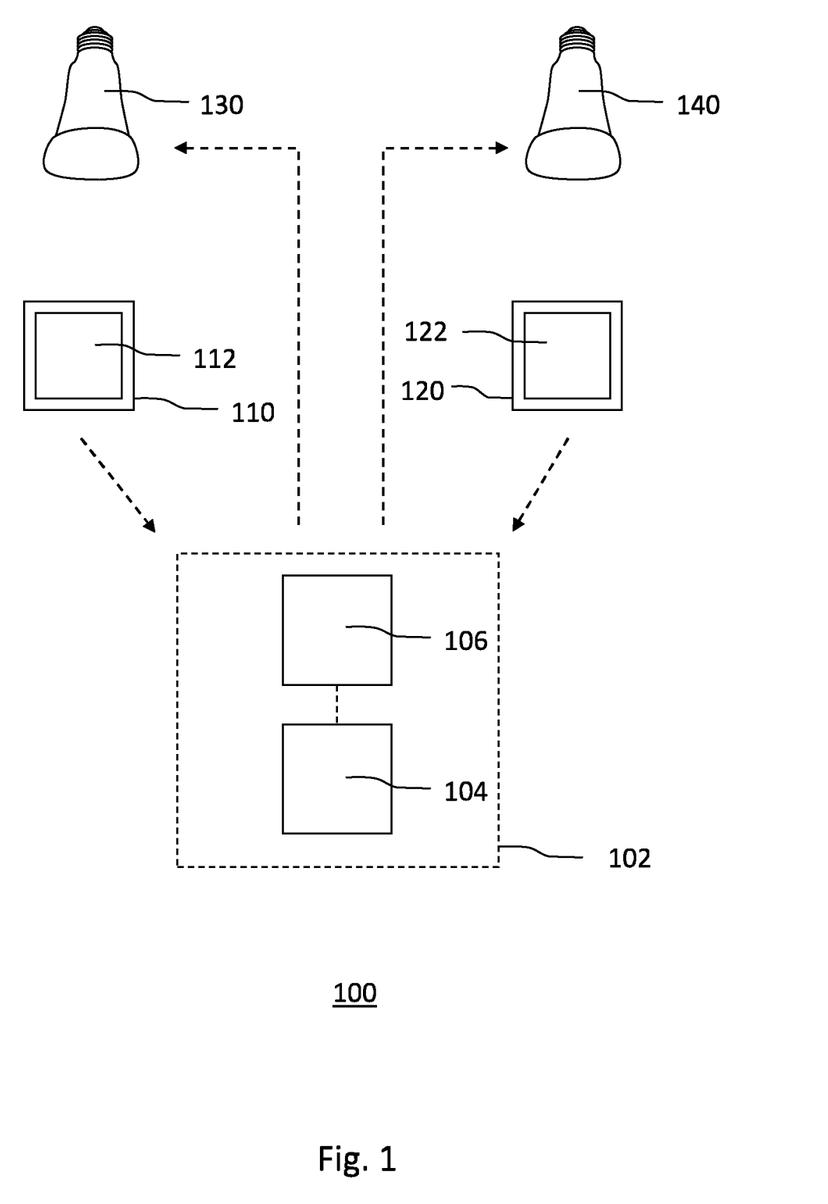
FIGS. 1 and 2 show schematically embodiments of a lighting system comprising a control system, a first light switch for controlling a first lighting device and a second light switch for controlling a second lighting device.

FIG. 1 shows schematically an embodiment of a lighting system 100 comprising a control system 102, a first light switch 110 for controlling a first lighting device 130 and a second light switch 120 for controlling a second lighting device 140. The control system comprises an input 106 configured to receive a signal indicative of an activation of a first user input element 112 of the first light switch 110, wherein the activation is indicative of a selection of a first light scene. The control system 102 further comprises a processor 104 (e.g. circuitry, a microcontroller, a microchip, etc.), which may be configured to control the first lighting device 130 according to the first light scene. The processor 104 is configured to associate a second light scene with a second user input element 122 of the second light switch 120 based on the selected first light scene, such that when the second user input element 122 is activated by a user, the second lighting device 140 is controlled according to the second light scene.

The first lighting device 130 and the second lighting device 140 are lighting devices configured to receive (wireless) signals (e.g. lighting control signals) from the first light switch 110 and the second light switch 120, respectively. The (wireless) signals may be received directly from the light switches (see the system 200 of FIG. 2) or via an intermediate device such as a bridge, a hub, a router, or another network device such as the control system 102. The light switches 110, 120 and the other network devices may comprise communication units for communicating lighting control signals via any wired or wireless communication protocol (e.g. Ethernet, DALI, Bluetooth, Wi-Fi, Li-Fi or ZigBee). The lighting devices 130, 140 comprise one or more light sources (e.g. LED light sources) and a control unit, such as a microcontroller (not shown), for controlling the light output generated by the light sources based on received lighting control signals. A lighting control signal may comprise lighting control settings for controlling the light output. The lighting control settings may relate light properties such as the color, intensity, saturation, beam size, beam shape, etc. according to which the one or more lighting devices are controlled. The light scene may be a dynamic light scene, wherein one or more light properties change over time.

The first light switch 110 comprises a first user input element 112 configured to receive a user input indicative of an activation of a light scene for the first lighting device 130, and the second light switch 120 comprises a second user input element 122 configured to receive a user input indicative of an activation of a light scene for the second lighting device 140. The user input elements 112, 122 may, for example, be physical user input elements such as buttons, touch-sensitive surfaces, rotary switches, toggle switches, etc. The first and/or second light switch may, for example, comprise one or more buttons configured to receive user input indicative of a selection of a light scene (e.g. a color, an intensity, a beam shape, etc.) for the respective lighting device. In embodiments, a user input element may be configured to receive multiple user inputs (e.g. multiple pressings of a button, a rotation of a rotary switch, etc.), for example enabling a user to cycle through different light scenes.

Figure 2:
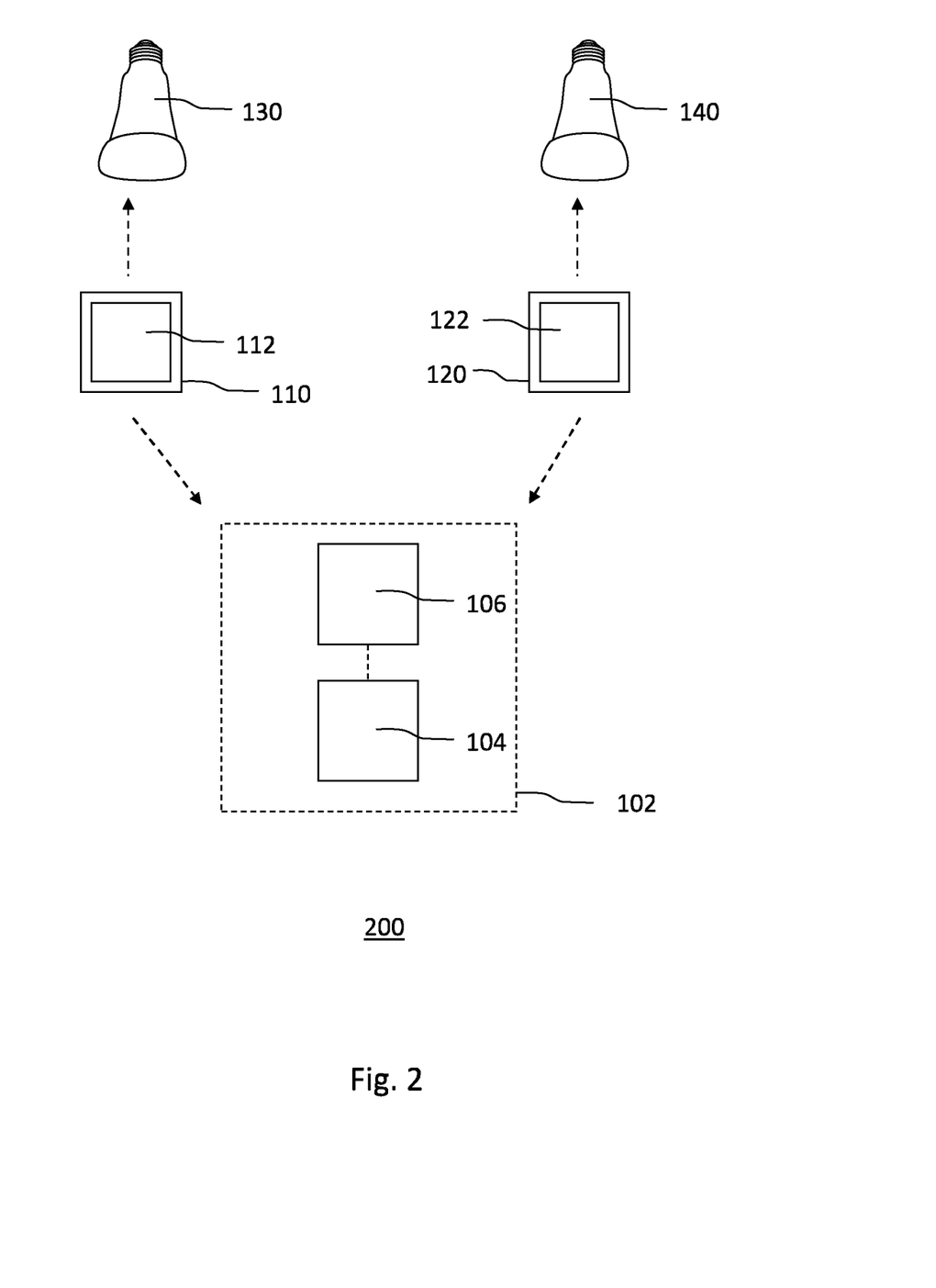

The control system 102 may, for example, be comprised in a separate device such as a bridge, a hub, a router, a smart device such as a smartphone, a remote server, etc. In FIGS. 1 and 2 the control system is illustrated as a separate device. It should be understood that the control system may be comprised in a lighting device, such as the first lighting device 130 and/or the second lighting device 140, or in a light switch, such as the first light switch 110 and/or the second light switch 120.

The control system 102 comprises an input configured to receive a signal indicative of an activation of the first user input element 112 of the first light switch 110, wherein the activation is indicative of a selection of a first light scene. A user may provide a user input at the first input element 112, whereupon the signal indicative thereof may be sent (either directly or indirectly) from the light first switch 110 to the control system 102. The input may be a network receiver configured to receive the signal. In embodiments wherein the control system is comprised in the first light switch 110, the input may be an input of the processor 104 configured to receive the signal.

The control system 102 further comprises a processor 104, which may be configured to control the first lighting device 130 according to the first light scene. In the example of FIG. 1, wherein the control system 102 is comprised in a separate device, the processor 104 may receive the signal from the first light switch 110, and communicate a lighting control signal to the first lighting device 130 in order to control it according to the selected first light scene. In other embodiments, as illustrated in FIG. 2, the first lighting device 130 may be controlled directly by the first light switch 110.

The processor 104 is further configured to associate a second light scene with the second user input element 122 of the second light switch 120 based on the selected first light scene. The processor 104 may, for example, generate a second light scene that is based on the selected first light scene. The processor 104 may generate the second light scene such that light properties of the second light scene are substantially similar to light properties of the first light scene, respectively. The second light scene may for example be generated such that its color and/or intensity is substantially similar to the color and/or intensity of the first light scene. Alternatively, the processor 104 may generate the second light scene such that the color values of the second light scene are substantially similar to color values of the first light scene, and intensity values of the second light scene are substantially different from intensity values of the first light scene. The second light scene may be generated such that its color (e.g. warm white) is substantially similar to the color (e.g. warm white) of the first light scene, and that its intensity is substantially different (e.g. higher or lower) than the intensity of the first light scene. For instance, in a bedroom lower intensity levels may be required/desired compared to a living room.

The processor 104 may be configured to select the second light scene from a plurality of second light scenes. The processor 104 may, for example, be configured to access a (remote) memory configured to store associations between first light scenes and second light scenes. The memory may, for example, store a lookup table with associations between first light scenes and second light scenes. The associations between first light scenes and second light scenes may be adjustable by a user, for instance via a user interface of a smart device such as a smartphone. Alternatively, the first light scene may be associated with a predefined home/lighting setting (e.g. a morning setting, an evening setting) and the processor 104 may select a second light scene associated with that predefined setting. Also these associations may be adjustable via a user interface.

When the processor 104 has associated the second light scene with the second user input element 122 of the second light switch 120, a user may activate the second user input element 122, whereupon the second lighting device 140 is controlled according to the second light scene. In the example of FIG. 1, the processor 104 may control the second lighting device 140 by communicating a lighting control signal to the second lighting device 140. In the example of FIG. 2, the processor 104 may be configured to communicate the association between the second input element 122 and the second light scene to the second light switch 120, and the second light switch may communicate a lighting control signal to the lighting second device 140 to control it according to the second light scene.

The processor 104 may be further configured to receive a (second) signal indicative of a second activation of the first user input element 112 (or another user input element, not shown in FIGS. 1 and 2) of the first light switch, wherein the second activation is indicative of a selection of a secondary first light scene. The processor 104 may then repeat the step of associating a secondary second light scene with the second user input element, wherein the association now is based on the selected secondary first light scene. As a result, the second lighting device 140 may be controlled according to the secondary second light scene when the second user input element 122 is activated by a user. This has been further illustrated in FIG. 4.

The processor 104 may be further configured to receive a signal indicative of an activation of the second user input element 122 of the second light switch 120, wherein the activation of the second user input element 122 is indicative of a selection of a further light scene for the second lighting device 140. The further light scene may be a light scene that has not been based on the first light scene selected at the first light switch 110. The processor 104 (see FIG. 1) or the light switch (see FIG. 2) may then control the second lighting device 140 according to the further light scene to activate the further light scene. The processor 104 may be further configured to associate a second further light scene with the first user input element 112 of the first light switch 110 based on the selected further light scene. The processor 104 may generate or select this second further light scene similar to any of the above-mentioned ways of selecting/generating the second light scene. As a result, the first lighting device 130 may be controlled according to the secondary second light scene when the first user input element 112 of the first light switch 110 is activated by a user. This has been further illustrated in FIG. 4.

The processor 104 may be further configured to reset the associations between user input elements and light scenes of the first light switch 110 and/or the second light switch 120 to a default or a predefined setting, wherein the associations between user input elements 112, 122 and light scenes are no longer based on selected light scenes. The processor 104 may be configured to reset the first light switch 110 and/or the second light switch 120 at a predefined moment in time, for example at a predefined time of the day. Additionally or alternatively, the processor 104 may be configured to receive a reset signal. The reset signal may, for example be received from a smart device (e.g. a smartphone), a central home/office control device, etc. The processor 104 may be configured to receive the reset signal from the first light switch 110 and/or the second light switch 120, and reset the associations between user input elements 112, 122 and light scenes. The reset signal may, for example, be transmitted by the first or second light switch upon activation of a user input element. A user may, for example, press the user input element 112, 122 during a predefined duration, a predefined number of times within a time period, etc., whereupon the respective light switch may transmit the reset signal. In embodiments, the first and/or the second light switch may comprise a dedicated user input element (e.g. an additional button) for transmitting the reset signal. In embodiments, a specific lighting control signal (e.g. an off signal) may be indicative of the reset signal. A user may, for example, switch a lighting device off whereupon the processor 104 may reset the associations between user input elements 112, 122 and light scenes.

Figure 3A:
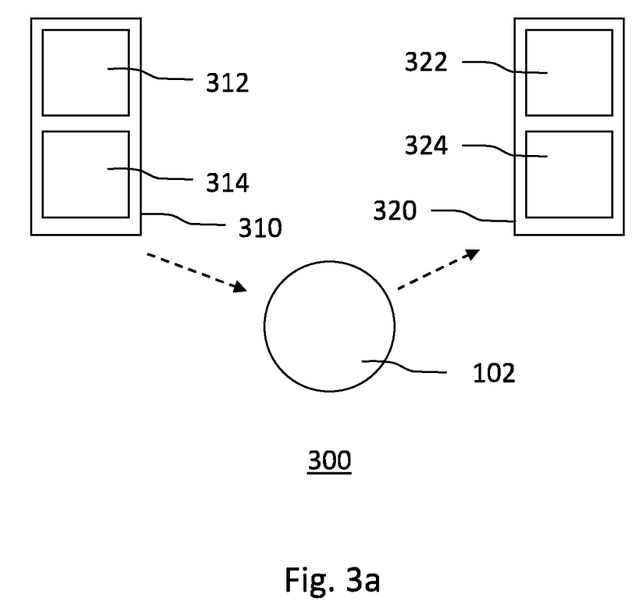
FIG. 3a shows schematically an embodiment of a lighting system comprising two light switches, each with two user input elements, and a control system.

FIG. 3a illustrates an embodiment of a lighting system 300 comprising the control system 102, a first light switch 310 and a second light switch 320. The first light switch 310 comprises a first user input element 312 and a second user input element 314. The second light switch 320 comprises a first user input element 322 and a second user input element 324. The first user input elements 312, 322 may for example be configured to receive multiple user inputs (e.g. multiple presses), wherein each subsequent user input is associated with a subsequent light scene. This enables a user to select a first light scene for the first lighting device (not shown). The selected first light scene may be communicated to the control system 102, whereupon the control system 102 may associate one or more second light scenes with the first user input element 322 of the second light switch 320, which in turn enables a user to select a second light scene that has been selected/generated based on the first light scene. The second user input elements 314, 324 may, for example, be configured to receive a user input associated with an "off" setting, enabling a user to switch off respective lighting devices.

Figure 3B:
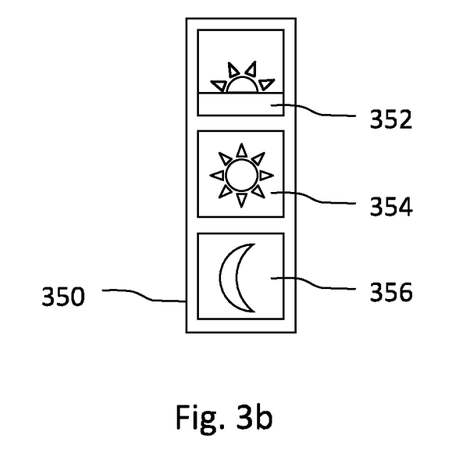
FIG. 3b shows schematically an embodiment of a light switch with three user input elements.

FIG. 3b shows schematically an embodiment of a light switch 350 with three user input elements 352, 354, 356. Each user input element comprises an icon indicating a predefined home/lighting setting (a morning setting 352, a daytime setting 354 and an evening/night setting 356). This enables a user to select a specific setting, whereupon the first lighting device (not shown) is controlled according to a first light scene associated with that setting. The processor 104 (not shown) may then select/generate a second light scene based on the first light scene associated with the setting, and associate the second light scene with a user input element of the second light switch.

Figure 4:
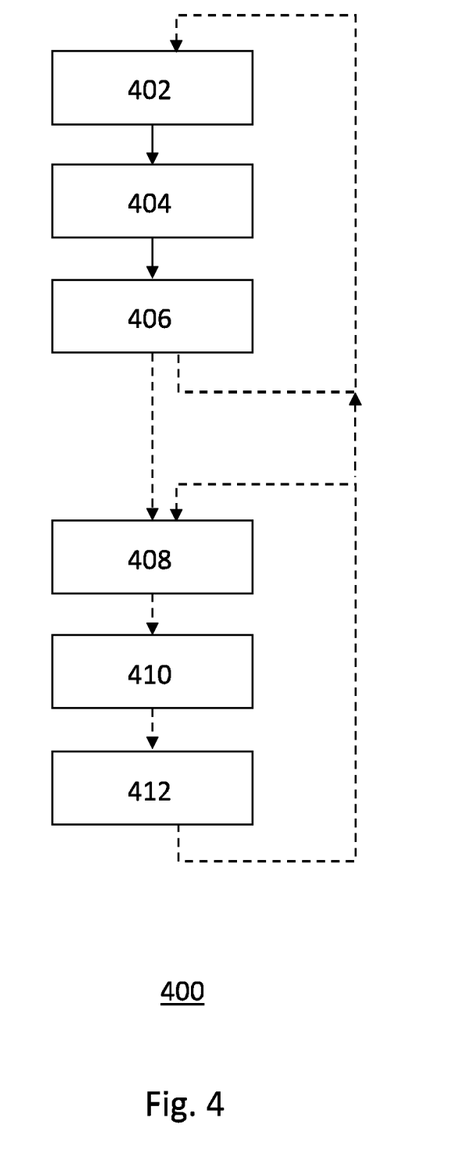
FIG. 4 shows schematically a method of configuring a lighting system comprising a first light switch for controlling a first lighting device and a second light switch for controlling a second lighting device.

FIG. 4 illustrates a method 400 of configuring a lighting system 100 comprising a first light switch 110 for controlling a first lighting device 130 and a second light switch 120 for controlling a second lighting device 140, the method 400 comprises receiving 402 a signal indicative of an activation of a first user input element 112 of the first light switch 110, wherein the activation is indicative of a selection of a first light scene. The method further comprises controlling 404 the first lighting device 130 according to the first light scene, and associating 406 a second light scene with a second user input element 122 of the second light switch 120 based on the selected first light scene, such that when the second user input element 122 is activated by a user, the second lighting device 140 is controlled according to the second light scene. The steps of the method 402, 404 and 406 may be repeated when a user provides a user input at the first user input element 112.

The method 400 may further comprise the steps of receiving 408 a signal indicative of an activation of the second user input element 122 of the second light switch 120, wherein the activation of the second user input element 122 is indicative of a selection of a further light scene for the second lighting device 140, controlling 410 the second lighting device 140 according to the further light scene, and associating 412 a second further light scene with the first user input element 112 of the first light switch 110 based on the selected further light scene, such that when the first user input element 112 is activated by a user, the first lighting device 130 is controlled according to the second further light scene. The steps of the method 402, 404 and 406 may be repeated when a user provides a user input at the first user input element 112. Similarly, the steps of the method 408, 410 and 412 may be repeated when a user provides a user input at the second user input element 122.

The method 400 may be executed by computer program code of a computer program product when the computer program product is run on a processing unit of a computing device, such as the processor 104 of the control system 102.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors or even the 'cloud'.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The invention claimed is:

1. A method of configuring a lighting system comprising a first light switch for controlling a first lighting device and a second light switch for controlling a second lighting device, the method comprising:
  receiving a signal indicative of an activation of a first user input element of the first light switch, wherein the activation is indicative of a selection of a first light scene,
  controlling the first lighting device according to the first light scene,
  associating a second light scene with a second user input element of the second light switch based on the selected first light scene, such that when the second user input element is activated by a user, the second lighting device is controlled according to the second light scene,
  receiving a signal indicative of a second activation of the first user input element or another user input element of the first light switch, wherein the second activation is indicative of a selection of a secondary first light scene,
  controlling the first lighting device according to the secondary first light scene, and
  associating a secondary second light scene with the second user input element based on the selected secondary first light scene, such that when the second user input element is activated by a user, the second lighting device is controlled according to the secondary second light scene.

2. The method of claim 1, further comprising:
  receiving a signal indicative of an activation of the second user input element of the second light switch, wherein the activation of the second user input element is indicative of a selection of a further light scene for the second lighting device,
  controlling the second lighting device according to the further light scene, and
  associating a second further light scene with the first user input element of the first light switch based on the selected further light scene, such that when the first user input element is activated by a user, the first lighting device is controlled according to the second further light scene.

3. The method of claim 1, wherein light properties of the second light scene are substantially similar to light properties of the first light scene.

4. The method of claim 1, wherein color values of the second light scene are substantially similar to color values of the first light scene, and wherein intensity values of the second light scene are substantially different from intensity values of the first light scene.

5. The method of claim 1, further comprising the step of associating the first user input element and/or the second user input element with a predefined light scene at a predefined moment in time.

6. The method of claim 1, further comprising:
receiving a reset signal from the first or the second light switch, and
associating the first user input element with a predefined light scene or associating the second user input element with a predefined light scene, respectively.

7. The method of claim 1, further comprising the step of generating the second light scene based on the selected first light scene.

8. The method of claim 1 further comprising the step of selecting the second light scene from a plurality of second light scenes based on the selected first light scene.

9. A control system for configuring a lighting system comprising a first light switch for controlling a first lighting device and a second light switch for controlling a second lighting device, the control system comprising:
  an input configured to receive a signal indicative of an activation of a first user input element of the first light switch, wherein the activation is indicative of a selection of a first light scene, wherein the first lighting device is controlled according to the first light scene, and
  a processor configured to associate a second light scene with a second user input element of the second light switch based on the selected first light scene, such that when the second user input element is activated by a user, the second lighting device is controlled according to the second light scene,
  wherein the input is further configured to receive a signal indicative of a second activation of the first user input element or another user input element of the first light switch, the second activation is indicative of a selection of a secondary first light scene, and
  the processor is further configured to associate a secondary second light scene with the second user input element based on the selected secondary first light scene, such that the second lighting device is controlled according to the secondary second light scene when the second user input element is activated by a user.

10. The control system of claim 9, wherein the control system is comprised in a central control device, and wherein the control system further comprises a communication unit configured to:
  receive the signal from the first light switch,
  receive lighting control signals from the second light switch, and
  transmit lighting control signals to the one or more first and second lighting devices.

11. A lighting system comprising:
  the control system of claim 9,
  the first light switch configured to control the first lighting device, and
  the second light switch configured to control the second lighting device.

12. The lighting system of claim 11, further comprising the first lighting device and the second lighting device.

* * * * *